United States Patent Office 3,639,366
Patented Feb. 1, 1972

3,639,366
PETROLEUM RESINS
Jacques Broca, Waterloo, and Jean-Paul Loree, Brussels, Belgium, and Ralph Howard Schatz, Westfield, N.J., assignors to Esso Research and Engineering Company
No Drawing. Filed June 11, 1968, Ser. No. 735,970
Claims priority, application France, June 12, 1967, 110,033; Great Britain, July 28, 1967, 34,855/67
Int. Cl. C08f 1/70
U.S. Cl. 260—82                                                8 Claims

ABSTRACT OF THE DISCLOSURE

Petroleum resins having low color and excellent color stability are prepared by polymerizing a light steam cracked naphtha having a final boiling point below 70° C. in a homogeneous medium in the presence of a liquid ternary catalyst comprising substantially equimolar quantities of an aluminum halide, a hydrogen halide, and an aromatic hydrocarbon and catalytically hydrogenating the resin resulting therefrom at elevated temperature and pressure.

---

The present invention is concerned with new light-coloured petroleum resins and a process for their manufacture.

It is well known that it is possible to obtain thermoplastic resins of the polydienic type by polymerisation in the presence of a catalyst of the Friedel-Crafts type from wide fractions of steam-cracked petroleum distillates boiling between 30 and 280° C., polymerisation generally being performed between 0 and 70° C. and for preference between 10 and 55° C. However, highly coloured resins are also obtained. Attempts may be made to improve the colour by the hydrogenisation of the polymer, but in this case a lowering of the ball/ring softening point is found as well as decrease in the resin yield. To avoid these drawbacks, one must carry out two hydrogenisations of the total polymer, one at a moderate temperature and the other at a higher temperature, both under pressure.

Furthermore, the narrow petroleum fractions cannot be polymerised by the usual process of heterogeneous catalysis with powdered aluminum chloride; indeed, polymerisation is violent and, exceeding the stage of the formation of a resin of mean molecular weight 2000 soluble in the reaction medium, it entails the considerable formation of an insoluble compound of the rubbery type termed "gel" in the trade.

Although substantial improvements upon the colour of petroleum resins could be made during the past 10 to 20 years none of the presently known methods of making petroleum resins leads to a material of satisfactory colour stability. Even resins of very light colour produced by the art techniques tend to darken on standing, particularly when exposed to elevated temperatures. This may be seen from the increase in Gardner colour with time of the hydrogenation product of a conventional petroleum resin, whose colour had decreased towards water-white as a result of the hydrogenation:

Resin tested:                                          Gardner colour
  Conventional petroleum resin hydrogenation
    product _____ 10–11
    (a) After hydrogenation _____ 2+
    (b) After 3 hrs. at 120° C. _____ 6+
    (c) After 3 hrs. at 150° C. _____ 10+
    (d) After 24 hrs. at 120° C. _____ 10+

These test results show that the low original colour is lost at typical use conditions involving elevated temperatures.

The applicants have discovered it is possible to obtain light-coloured resins, with a softening point in the region of 100° C., with great heat stability, from a narrow cut light steam cracking naphtha.

According to the process of the invention a narrow fraction of light steam cracked naphtha i.e. one, distilling below 70° C., is subjected to polymerisation in a homogeneous medium in the presence of a liquid phase catalyst.

The charge to be polymerised is a fraction of light steam cracked naphtha, whose final boiling point is less than 70° C., and for preference about 50° C. Such naphthas include light unsaturated gasoline cuts derived from the steam cracking of a petroleum fraction such as kerosene, gas oil or heavy naphtha.

As catalyst, one uses a liquid ternary complex comprising in substantially equimolar quantities, an aluminium halide, for preference aluminium chloride, a hydrogen halide, for preference hydrochloric acid, and an aromatic hydrocarbon or mixture of hydrocarbons. Suitable aromatic hydrocarbons include mesitylene, and as a mixture, for instance:

|            | Percent by wt. |
|------------|----------------|
| m-Xylene   | 57             |
| op-Xylene  | 14             |
| Ethylbenzene | 29           |

As liquid catalyst, it is also possible to use spent dodecyl-benzene sludge, which contains in the region of 24 to 30% by weight aluminium trichloride.

With this type of catalyst, polymerisation may be performed with the reaction medium having a temperature of 40° C. ±5° C. for a period from 60 to 120 minutes with a proportion of complex AlCl3 in the range of 0.8 to 1.2 and for preference 1% by weight, in relation to the naphtha. The reaction medium may if desired by diluted with a saturated hydrocarbon, e.g. heptane.

A polymer is thus obtained which contains, besides resin, lower polymerisation products of the gas oil and oil type (termed in the trade "Fill") of residual naphtha and catalyst in the free state or in the state of complex with the reaction products.

The catalyst may be thereafter destroyed with an ammoniacal solution to which there is added, to improve the decantation of the alumina, a surface-active agent such as a solution of 75% by weight of technical dimethyl-benzyl-palmito-stearyl ammonium chloride in isopropanol. The polymer may be distilled at a temperature of 200° C. at the bottom of the distillation column, and then steam distillation may be carried out at 250° C. until the volumetric ratio between the quantity of light polymers (fill) and water is equal to about 20.

There are thus obtained resins whose softening point is in the region of 100° C., the Gardner colour between 3 and 5, the bromine number in the region of 20. They possess excellent thermal stability for the Gardner colour only loses one or two points at most after 3 hours' heating at 150° C.

In the preferred embodiment of this invention one is often able to obtain petroleum resins having an initial Gardner colour of less than 2 and a colour stability such that after heating in air for 3 hrs. at 150° C. the Gardner colour does not exceed 4–5. Also petroleum resins of improved odour and low unsaturation are usually obtained.

According to the preferred embodiment of this invention the resin recovered from the polymerisation mixture of the process described above is subjected to catalytic hydrogenation at an elevated temperature and under superatmospheric pressure.

The recovered resin is subjected to catalytic hydrogenation at an elevated temperature and pressure. The resin may be melted and hydrogenated as such or it may be redissolved in a suitable solvent, such as hexane, benzene and paraffinic or aromatic hydrocarbon fractions. The hydrogenation of the molten resin or resin solution may be effected under a pressure of 7 to 350 kg./cm.$^2$ preferably 35 to 210 kg./cm.$^2$, at a temperature of 38° C.–399° C., preferably 149° to 288° C., in the presence of a suitable hydrogenation catalyst, such as supported or unsupported nickel, reduced nickel, molybdenum sulphide, or copper chromite.

U.K. specifications 766,894 and 821,698 disclose representative techniques which can be used to carry out the hydrogenation step of the present invention. Thus, the hydrogenation may be carried out for 1 to 20 hours, and if a batch process is used the amount of catalyst may be 5 to 50% by weight based on the amount of resin being hydrogenated. If a continuous hydrogenation is used, the feed rate of resin solution through the catalyst bed may be 0.05 to 5.0 volumes of liquid feed per volume of catalyst per hour, preferably 0.1 to 1.0 v./v./hr.

While the conditions of the hydrogenation are conventional, it is an important feature of the invention to apply the hydrogenation to the particular petroleum resins described above, which are derived from a low-boiling gasoline fraction as defined herein. The hydrogenation of these resins in accordance with the present invention leads to materials of greatly improved colour stability. An added benefit flowing from the process of the invention is the removal of the combined halide present in these resins due to the use of aluminum halide complex catalysts.

The petroleum resins prepared in accordance with the instant invention are useful in the manufacture of tiles, paints, varnishes, and adhesives.

The following examples illustrate the invention.

EXAMPLE 1

There was first prepared a catalyst in the form of a liquid ternary complex. In a reactor, one mole of powdered aluminium chloride was mixed with one mole of mesitylene. To the stirred mixture was added one mole of hydrochloric acid until absorption was complete. The progress of the formation of the complex was followed by means of the temperature of the reaction, which passes through a maximum.

The naphtha which was used was the fraction of steam-cracked debutanised light naphtha, whose final boiling point is 50° C. and which is known in the trade by the formula I.P.→50° C.

This fraction, with the addition of heptane in the proportion of 20% by weight in relation to the fraction was polymerised for 75 minutes with a quantity of catalyst such that the proportion of complexed AlCl3 in relation to the naphtha was 1% by weight.

After the destruction of the catalyst, decanting, distilling and steam distilling, a resin having the following characteristics was extracted.

Yield—54% by weight in relation to fraction
Softening point—93° C.
Gardner colour—4.

EXAMPLE II

A liquid ternary complex was prepared under the same conditions as before, but the mesitylene being replaced by the mixture:

| | Percent by wt. |
|---|---|
| m-Xylene | 57 |
| op-Xylene | 14 |
| Ethylbenzene | 29 |

It was used in polymerisation in the same proportion as before (1% by weight complexed AlCl3 in relation to the naphtha) with a fraction: I.P.→50° C. light cracked naphtha, diluted with 20% by weight of heptane. Washing was carried out with a solution representing 15% by weight of diluted naphtha, containing 8% by weight of ammonia and 2% by weight of a solution containing 75% by weight dimethyl-benzyl-palmito-stearly ammonium chloride in isopropanol. The alumina and the "gel" were decanted.

The light products (residual naphtha, first fraction of fill) were distilled off at a temperature of 200° C. at the bottom of the column, and then steam distillation of the rest of the fill was carried out at 250° C. for 45 minutes.

A resin was thus obtained, with a yield of 53% in relation to the initial fraction, and having a softening point of 94° C. and a Gardner colour of 4+.

EXAMPLE III

The catalyst which was used was a spent dodecylbenzene sludge derived from alkylating, in the presence of powdered aluminum chloride, benzene with propylene tetramer.

The AlCl3 content of this sludge was determined and in the proportion of 1% by weight complexed AlCl3.

The polymerisation of a fraction I.P.→50° C. was carried out under the same conditions as in Example II.

With a yield of 53% by weight in relation to the initial fraction, a resin was obtained with softening point 92° C. and Gardner colour 4.5.

EXAMPLE IV

A catalyst, in the form of a liquid ternary complex, is prepared by mixing one mole of aluminium chloride powder with one mole of mesitylene. Into the agitated mixture one mole of hydrochloric acid is introduced under conditions of complete absorption. The progressive formation of the complex can be followed by observing the temperature, which goes through a maximum.

A debutanized light gasoline fraction derived from the steam-cracking of naphtha and characterised by a final boiling point of 50° C. is used as the starting material for the polymerisation. In the art this gasoline fraction is commonly referred to as IBP→50° C.

Heptane in an amount of 20 wt. percent, based on the weight of the gasoline fraction, is added and the mixture is polymerised at 40° C. for 75 minutes with the aid of the above complex AlCl3 catalyst in an amount of 1% by weight, based on the gasoline fraction.

After the destruction of the catalyst, decantation distillation and steam-distillation, a petroleum resin is recovered having the following characteristics:

Yield—54% by weight based on gasoline fraction
Softening point— 93° C.
Gardner colour—4
Colour stability in air:
    (a) Gardner colour after 3 hrs. at 120° C.—5
    (b) Gardner colour after 24 hours at 120° C.—7—
Bromine number—35
Combined chloride—1,200 p.p.m.

The petroleum resin is dissolved in n-hexane to form a 76 wt. percent solution. The solution is hydrogenated in an autoclave, using a hydrogen pressure of 190 kg./cm.$^2$ for about 12 hours at 204° C. in the presence of reduced neckel supported on a porous carrier in an amount of 15 wt. percent nickel, based on resin.

The resulting solution is stripped down to recover the hydrogenated resin. It has the following properties:

Bromine number—5
Combined chlorine—0
Gardner colour—2—
Colour stability in air as measured by Gardner colour after 3 hrs. at 150° C.—4.5.

It is clear from these results that the hydrogenation of the petroleum resin made by the above procedure results in a material of superior colour stability.

What is claimed is:

1. A process for preparing a petroleum resin comprising the steps of:
   (a) polymerizing a light steam cracked naphtha with a final boiling point below 70° C. in a homogeneous medium in the presence of a liquid ternary catalyst comprising substantially equimolar quantities of an aluminum halide, a hydrogen halide, and at least one aromatic hydrocarbon;
   (b) destroying any catalyst remaining in the resin resulting from step (a); and
   (c) subjecting the resin resulting from step (b) to catalytic hydrogenation at an elevated temperature and pressure.

2. A process according to claim 1 in which the steam cracked naphtha has a boiling point of about 50° C.

3. A process according to claim 1 in which the aromatic hydrocarbon is mesitylene.

4. A process according to claim 1 in which the polymerisation is carried out at a temperature of 40° C.±5° C. for 60 to 120 minutes, with a quantity of $AlCl_3$ in complex form in the range 0.8 to 1.2% by weight in relation to the naphtha.

5. A process according to claim 1 in which the elevated temperature is between 38° and 399° C.

6. A process according to claim 1 in which the pressure is between 7 and 350 kg./cm.$^2$.

7. A process according to claim 1 in which the hydrogenation catalyst is selected from the group consisting of supported and unsupported nickel, molybdenum sulphide and copper chromite.

8. The process of claim 1 in which the aluminum halide is aluminum chloride, the hydrogen halide is hydrochloric acid, and the aromatic hydrocarbon is mesitylene.

References Cited

UNITED STATES PATENTS

| | | | |
|---|---|---|---|
| 2,062,845 | 12/1936 | Thomas et al. | 260—2 |
| 2,891,933 | 6/1959 | Roberts | 260—82 |
| 2,906,726 | 10/1959 | Fitz Gerald et al. | 260—45.7 |
| 3,042,660 | 7/1962 | Habeshaw et al. | 260—82 |
| 3,406,156 | 10/1968 | Aldridge et al. | 260—82 |

OTHER REFERENCES

Polymer Processes, Schildknecht (1956), p. 201.

JOSEPH L. SCHOFER, Primary Examiner

S. M. LEVIN, Assistant Examiner